G. A. LYON.
BUFFER FOR MOTOR CARS.
APPLICATION FILED DEC. 18, 1914. RENEWED JULY 18, 1919.
1,325,744.
Patented Dec. 23, 1919.
2 SHEETS—SHEET 1.
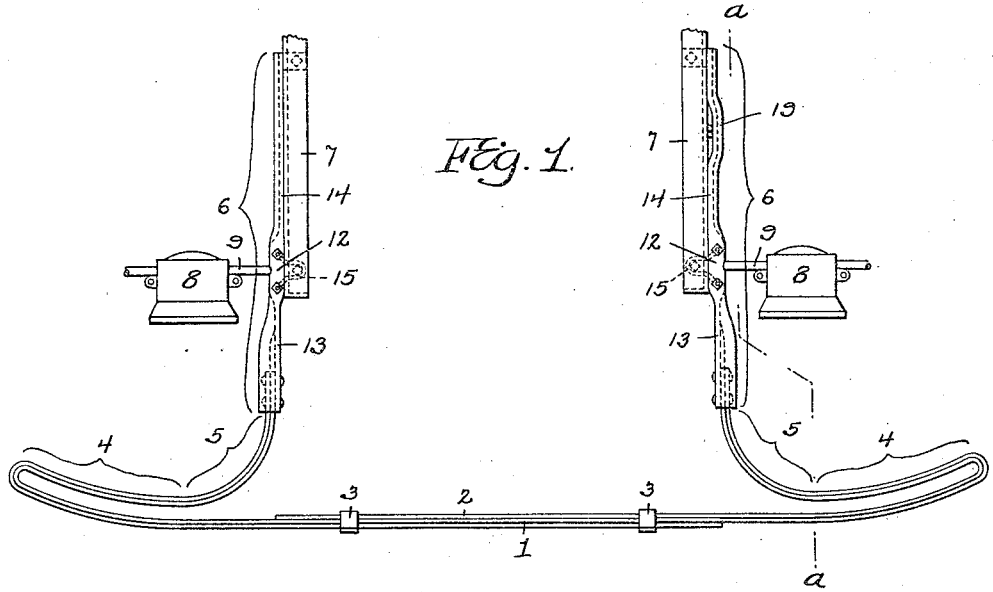
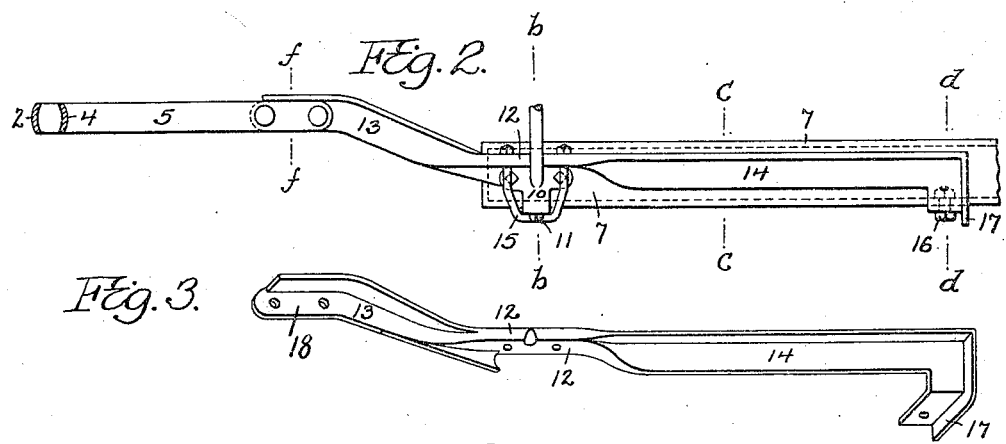
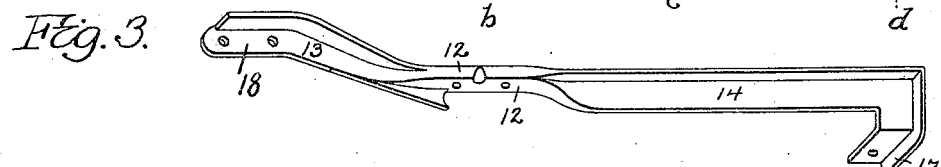
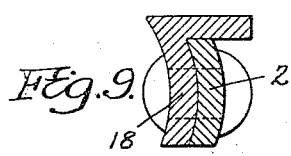
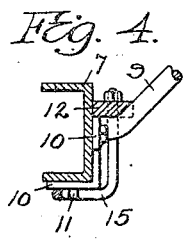
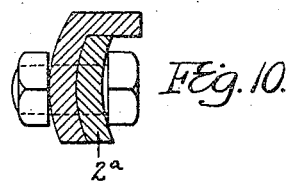
WITNESSES
INVENTOR
GEORGE ALBERT LYON
BY HIS ATTORNEY G. A. LYON.
BUFFER FOR MOTOR CARS.
APPLICATION FILED DEC. 18, 1914. RENEWED JULY 18, 1919.
1,325,744.  Patented Dec. 23, 1919.
2 SHEETS—SHEET 2.
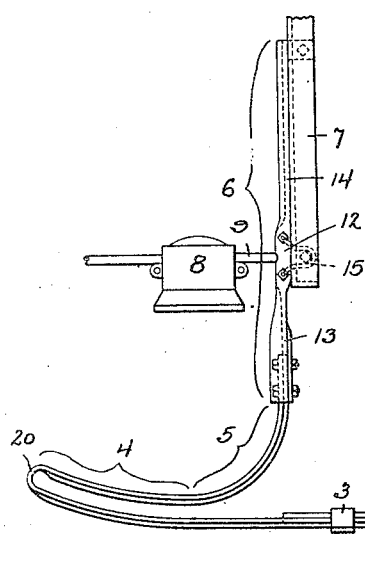
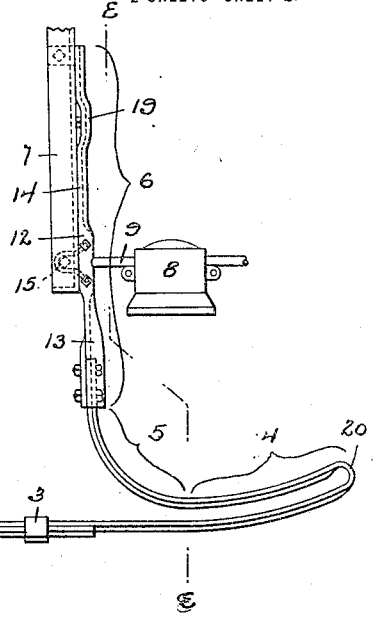
Fig. 7.
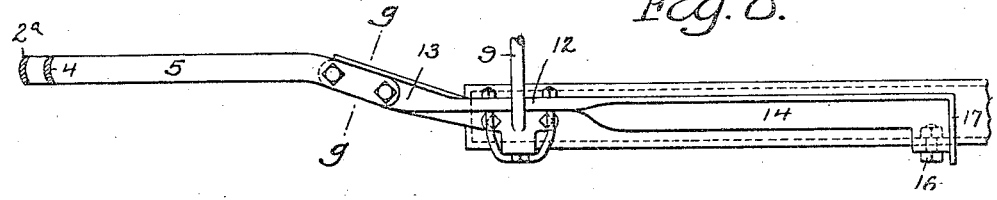
Fig. 8.
Fig. 16.
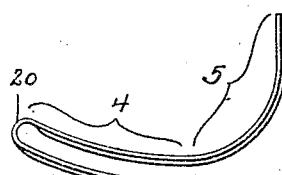
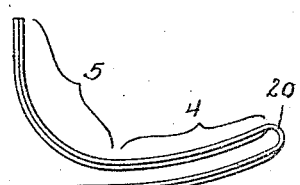
WITNESSES
INVENTOR
GEORGE ALBERT LYON
BY HIS ATTORNEY

UNITED STATES PATENT OFFICE.

GEORGE ALBERT LYON, OF PHILADELPHIA, PENNSYLVANIA, ASSIGNOR TO LYON NON-SKID COMPANY, OF PHILADELPHIA, PENNSYLVANIA, A CORPORATION OF PENNSYLVANIA.

BUFFER FOR MOTOR-CARS.

1,325,744.                         Specification of Letters Patent.     Patented Dec. 23, 1919.

Application filed December 18, 1914, Serial No. 877,887. Renewed July 18, 1919. Serial No. 311,906.

*To all whom it may concern:*

Be it known that I, GEORGE ALBERT LYON, a citizen of the United States, residing in Philadelphia, Pennsylvania, have invented certain Improvements in Buffers for Motor-Cars, of which the following is a specification.

My invention has been designed especially with the view of providing an effective form of buffer for application to the well-known Ford motor car without necessitating any change in the structure of the latter. The buffer comprises opposite rigid longitudinal members for application to the side frames of the car and a resilient member extending transversely across the front of the car from one of said rigid side members to the other. The side members are so formed and so mounted as to possess the maximum of rigidity and the resilient member consists of a bar or pair of bars bent so as to provide the desired amount of elasticity, the bar itself or the pair of bars, however, being so shaped in cross section as to increase their resistance to bending strain.

In the accompanying drawings—

Figure 1 is a plan view of my improved buffer structure with sufficient of the framework of the car to illustrate the application of the buffer thereto;

Fig. 2 is a view, partly in side elevation and partly in section, on the line *a—a*, Fig. 1;

Fig. 3 is a perspective view of a portion of one of the fixed members of the buffer looking from the under side of the same;

Fig. 4 is a transverse section on the line *b—b*, Fig. 2;

Fig. 5 is a transverse section on the line *c—c*, Fig. 2;

Fig. 6 is a transverse section on the line *d—d*, Fig. 2;

Fig. 7 is a view similar to Fig. 1, but illustrating a special form of resilient member of the buffer;

Fig. 8 is a view, partly in side elevation and partly in section, on the line *e—e*, Fig. 7;

Fig. 9 is a section on the line *f—f*, Fig. 2;

Fig. 10 is a section on the line *g—g*, Fig. 8, and

Fig. 11 is a top or plan view of a resilient member of the buffer comprising but a single bar.

Figs. 2, 3 and 8 are on a larger scale than Figs. 1, 7 and 11, Figs. 4, 5 and 6 are on a larger scale than Figs. 2, 3 and 8, and Figs. 9 and 10 are on a larger scale than Figs. 4, 5 and 6.

The resilient member of the buffer shown in Fig. 1 consists of two bars 1 and 2 extending transversely across the front of the car, the central portions of these bars overlapping one another and being held in position by any suitable clips 3, each bar being then turned back on itself so as to form the end loop 4 which is, by preference, bent slightly to the rear, said end loop 4 terminating at the inner end of its rear member in a bow 5 whose rear end is connected to the rigid member 6 of the buffer, the latter being secured to the forward end of one of the side frames 7 of the car. In order that this connection of the rigid member 6 of the buffer to the frame of the car may be effected without any alteration of the latter I mount said rigid member in the following manner:

The headlight 8 is mounted upon an arm 9 which projects outwardly from a bracket 10, the latter bearing against the outer side of the car frame 7 and against the under flange of the same and being secured to said under flange by means of a nut 11. The rigid member of the buffer comprises three parts 12, 13 and 14, the forward and rear portions 13 and 14 being of right-angled cross section and the intermediate portion 12 being a horizontal plate which connects said forward and rear portions and rests upon the lamp arm 9 and its bracket 10, as shown in Fig. 4, being held firmly in contact with said lamp arm and bracket by means of a yoke 15 whose lower looped portion extends beneath the horizontal portion of the bracket 10 and engages the securing bolt 11 and its upwardly projecting ends passing through openings in the plate 12 and being threaded for the reception of nuts which bear upon the top of said plate 12, as shown in Figs. 2 and 4.

The back end of the vertical flange of the rear portion 14 of the rigid member of the buffer extends down beneath the horizontal bottom flange of the side bar 7 of the car, as shown in Fig. 6, and is secured thereto by means of a bolt 16 passing through an opening with which the flange is usually provided at this point, said bolt having a nut bearing upon the top of the flange, as shown in Fig. 6. In order to stiffen and strengthen the rear end of the rigid member of the buffer the same has a laterally projecting flange 17, as shown in Figs. 2 and 6.

The vertical flange of the forward portion 13 of the rigid member of the buffer is of concavo-convex cross section at its front end, as shown at 18 in Fig. 9, and the bar 1 or 2 of the resilient member of the buffer which bears against said portion 13 of the rigid member is likewise of concavo-convex cross section and is firmly bolted or riveted to the flange 18, as shown in Fig. 9. The concavo-convex cross section of the bars 1 and 2 continues throughout the entire length of the same and serves to stiffen the bar and enable it to better resist bending strains than would a flat bar, the resilience of the buffer as a whole being due to the loops 4 and bows 5 which act in the nature of springs.

In order to lessen the shearing strain upon the lamp arm 9 which might otherwise be caused when rearward pressure was exerted upon the buffer, the vertical flange of the forward portion 13 of the rigid member of the buffer bears at its rear end against the forward end of the lamp arm bracket 10, as shown in Figs. 2 and 8.

The bend 19 in the left hand rigid member of the buffer is formed therein in order to clear the nut which is present on the left hand side frame of a car of the type for which my improved buffer has been designed.

The bars 1ª and 2ª comprising the resilient member of the buffer shown in Fig. 7 are concavo-convex in cross section but instead of presenting their convex faces in reverse directions in the looped portion 4 of the structure, as in Figs. 1 and 2, they present said convex faces to the front both in the front and rear portions of said loop, as shown in Fig. 8, the end of the loop being flat in cross section, as shown at 20 in Fig. 7, and this is also true of the single bar resilient member shown in Fig. 11.

I claim:

1. In automobile buffers, the combination of a Ford or similar automobile, a resilient buffer formed of wide thin spring strips to be relatively rigid vertically while resiliently yielding in horizontal directions, said buffer comprising a reinforced transverse impact receiving portion, lateral open-ended spring loops and connected rearwardly extending attaching members and substantially rigid flanged extension supporting members rigidly connected to the flanged frame members of the automobile to extend substantially in line therewith forward beyond the ends thereof and having flanged ends into which said attaching members are rigidly and removably bolted to be substantially in line therewith.

2. In automobile buffers, the combination of an automobile, a resilient buffer formed of wide thin spring strip to be relatively rigid vertically while resiliently yielding in horizontal directions, said buffer comprising a transverse impact receiving portion and connected rearwardly extending attaching members and substantially rigid extension supporting members connected to the frame members of the automobile to extend forward therefrom and having angular front portions to engage said attaching members and be removably and rigidly connected thereto.

3. In automobile buffers, the combination of a Ford or similar automobile, a resilient buffer formed of wide thin spring strips to be relatively rigid vertically while resiliently yielding in horizontal directions, said buffer comprising a reinforced transverse impact receiving portion, and connected rearwardly extending attaching members having ends formed with a curved cross section for increased horizontal stiffness and substantially rigid flanged extension supporting members rigidly connected to the flanged frame members of the automobile to extend substantially in line therewith forward beyond the ends thereof and removably and having curved section ends into which said attaching members are rigidly bolted to be substantially in line therewith.

4. In automobile buffers, the combination of an automobile, a resilient buffer formed of wide thin spring strip to be relatively rigid vertically while resiliently yielding in horizontal directions, said buffer comprising a transverse impact receiving portion and connected rearwardly extending attaching members having ends formed with a bent cross-section for increased horizontal stiffness and substantially rigid extension supporting members connected to the frame members of the automobile to extend forward therefrom and having flanged stiffened front portions and coöperating means to removably and substantially rigidly secure thereto each of said attaching members.

5. The combination of the side frame of a motor car having secured thereto a bracket carrying a laterally projecting arm and having a downwardly projecting bolt below the side frame, and a buffer having a side member provided with a plate located above and resting upon the arm and a yoke securing said side member in position and passing beneath the side frame and engaging the downwardly projecting bracket bolt.

6. In automobile buffers, a resilient buffer formed of wide thin spring strip to be relatively rigid vertically while resiliently yielding in horizontal directions, said buffer comprising a transverse impact receiving portion and connected rearwardly extending attaching members, and relatively rigid extension supporting members adapted to be connected to the frame members of an automobile and extend forward therefrom and having bent stiffened front portions to be removably and rigidly connected to the attaching members of the buffer.

In testimony whereof I have signed my name to this specification, in the presence of two subscribing witnesses.

GEORGE ALBERT LYON.

Witnesses:
 KATE A. BEADLE,
 HAMILTON D. TURNER.